(12) United States Patent
Hasegawa et al.

(10) Patent No.: US 10,855,075 B2
(45) Date of Patent: Dec. 1, 2020

(54) SURGE PROTECTIVE CIRCUIT AND SURGE PROTECTIVE DEVICE

(71) Applicant: FANUC CORPORATION, Yamanashi (JP)

(72) Inventors: Nozomu Hasegawa, Yamanashi (JP); Yoshikiyo Tanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 35 days.

(21) Appl. No.: 16/165,595

(22) Filed: Oct. 19, 2018

(65) Prior Publication Data

US 2019/0148935 A1 May 16, 2019

(30) Foreign Application Priority Data

Nov. 15, 2017 (JP) .................. 2017-220155

(51) Int. Cl.
*H02H 9/06* (2006.01)

(52) U.S. Cl.
CPC ..................... *H02H 9/06* (2013.01)

(58) Field of Classification Search
CPC ....................................... H02H 9/06
See application file for complete search history.

(56) References Cited

U.S. PATENT DOCUMENTS

| 2014/0168833 | A1* | 6/2014 | Sesink | ........... | H02H 9/042 |
| | | | | | 361/56 |
| 2016/0172848 | A1* | 6/2016 | Skinner | ........... | H01T 4/02 |
| | | | | | 361/91.1 |

FOREIGN PATENT DOCUMENTS

| CN | 201018277 Y | 2/2008 |
| CN | 201478826 U | 5/2010 |
| CN | 201985520 U | 9/2011 |
| CN | 103199516 A | 7/2013 |
| CN | 103650279 A | 3/2014 |
| CN | 104009460 A | 8/2014 |
| CN | 203839939 U | 9/2014 |
| CN | 206117149 U | 4/2017 |
| CN | 206211524 U | 5/2017 |

(Continued)

OTHER PUBLICATIONS

An Office Action mailed by the Chinese Patent Office dated Nov. 29, 2019, which corresponds to Chinese Patent Application No. 201811278412.6 and is related to U.S. Appl. No. 16/165,595.

(Continued)

*Primary Examiner* — Scott Bauer
(74) *Attorney, Agent, or Firm* — Studebaker & Brackett PC (57) ABSTRACT

A surge protective circuit is connected between a single-phase AC power source and an apparatus that operates with electric power supplied from the AC power source to suppress an overvoltage applied from the AC power source to the apparatus. The surge protective circuit includes: a first constant-voltage device and a first discharge device connected in series between a first ground terminal and a non-ground-side terminal of the AC power source; and a second constant-voltage device and a second discharge device connected in series between a second ground terminal and a ground-side terminal of the AC power source. A midpoint between the first constant-voltage device and the first discharge device and a midpoint between the second constant-voltage device and the second discharge device are connected.

7 Claims, 8 Drawing Sheets

(56) References Cited

FOREIGN PATENT DOCUMENTS

| | | |
|---|---|---|
| DE | 69814257 T2 | 10/2003 |
| JP | 2002-281662 A | 9/2002 |
| JP | 2009-284580 A | 12/2009 |
| JP | 5020560 B2 | 9/2012 |
| JP | 5272123 B2 | 8/2013 |

OTHER PUBLICATIONS

An Office Action mailed by the German Patent Office dated Jul. 20, 2020, which corresponds to German Patent Application No. 102018008712.4 and is related to U.S. Appl. No. 16/165,595; with English language Concise Explanation.

An Office Action mailed by China National Intellectual Property Administration dated Aug. 31, 2020, which corresponds to Chinese Patent Application No. 201811278412.6 and is related to U.S. Appl. No. 16/165,595 with English language translation.

* cited by examiner

SURGE PROTECTIVE CIRCUIT AND SURGE PROTECTIVE DEVICE

This application is based on and claims the benefit of priority from Japanese Patent Application No. 2017-220155, filed on 15 Nov. 2017, the content of which is incorporated herein by reference.

BACKGROUND OF THE INVENTION

Field of the Invention

The present invention relates to a surge protective circuit and a surge protective device including the same.

Related Art

A large number of electronic apparatuses used in offices, plants, and the like may experience inconveniences such as dielectric break-down, malfunctioning, and deterioration of devices when an overvoltage is applied to a power line due to lightening surge. Conventionally, an insulated transformer used as countermeasures against lightening surge can reliably insulate a primary side and a secondary side of a power line. However, since the insulated transformer is expensive and has large outside dimensions, it has a drawback that a large installation space is necessary. On the other hand, an electronic component called a surge protective device (SPD) is also used as countermeasures against lightening surge (for example, see Patent Documents 1 and 2).

SUMMARY OF THE INVENTION

Since the surge protective device is formed of electric components such as a varistor, a gas arrestor, and the like, the size thereof can be reduced more easily than the insulated transformer. However, these devices deteriorate gradually when an overvoltage is applied repeatedly, a failure is more likely to occur than the insulated transformer. Although the surge protective device may be duplicated to solve this problem, if the surge protective device is simply duplicated, the number of components increases and it is difficult to reduce the size. As an example of simple duplication, a configuration in which two sets of components each component being made up of one gas arrestor and two varistors are connected in parallel with respect to a power line may be considered. In this case, four varistors in total are required for the two duplicated gas arrestors.

An object of the present invention is to provide a surge protective circuit and a surge protective device capable of reliably protecting an electronic apparatus from lightening surge while realizing reduction in number of components.

(1) The present invention provides a surge protective circuit (for example, a surge protective circuit 30 to be described later) connected between a single-phase AC power source (for example, a power source device 10 to be described later) and an apparatus (for example, an electronic apparatus 20 to be described later) that operates with electric power supplied from the AC power source to suppress an overvoltage applied from the AC power source to the apparatus, the surge protective circuit including: a first constant-voltage device (for example, a first varistor 31 to be described later) and a first discharge device (for example, a first gas arrestor 33 to be described later) connected in series between a first ground terminal (for example, a first ground terminal 35 to be described later) and a non-ground-side terminal (for example, an L-terminal to be described later) of the AC power source; and a second constant-voltage device (for example, a second varistor 32 to be described later) and a second discharge device (for example, a second gas arrestor 34 to be described later) connected in series between a second ground terminal (for example, a second ground terminal 36 to be described later) and a ground-side terminal (for example, an N-terminal to be described later) of the AC power source, wherein a midpoint (for example, a midpoint N1 to be described later) between the first constant-voltage device and the first discharge device and a midpoint (for example, a midpoint N2 to be described later) between the second constant-voltage device and the second discharge device are connected.

(2) The present invention also provides a surge protective circuit (for example, a surge protective circuit 130 to be described later) connected between a three-phase AC power source (for example, a power source device 110 to be described later) and an apparatus that operates with electric power supplied from the AC power source to suppress an overvoltage applied from the AC power source to the apparatus, the surge protective circuit including: a first constant-voltage device (for example, a first varistor 131 to be described later) and a first discharge device connected in series between a first ground terminal and a first phase terminal (for example, a U-terminal to be described later) of the AC power source; a second constant-voltage device (for example, a second varistor 132 to be described later) and a second discharge device connected in series between a second ground terminal and a second phase terminal (for example, a V-terminal to be described later) of the AC power source; and a third constant-voltage device (for example, a third varistor 133 to be described later) connected to a third phase terminal (for example, a W-terminal to be described later) of the AC power source, wherein a midpoint between the first constant-voltage device and the first discharge device, a midpoint between the second constant-voltage device and the second discharge device, and a side of the third constant-voltage device opposite to a side connected to the third phase terminal are connected.

(3) The present invention also provides a surge protective device (for example, a surge protective device 230 to be described later) including the surge protective circuit according to (1) or (2).

According to the present invention, it is possible to provide a surge protective circuit and a surge protective device capable of reliably protecting an electronic apparatus from lightening surge while realizing reduction in number of components.

DETAILED DESCRIPTION OF THE INVENTION

Hereinafter, an embodiment of a surge protective circuit and a surge protective device according to the present invention will be described. The diagrams attached to the present specification are schematic diagrams, and respective portions are indicated by circuit symbols, functional blocks, and the like for better understanding of the present invention. In the respective diagrams, impedance components and the like are not illustrated.

First Embodiment

Figure 1:
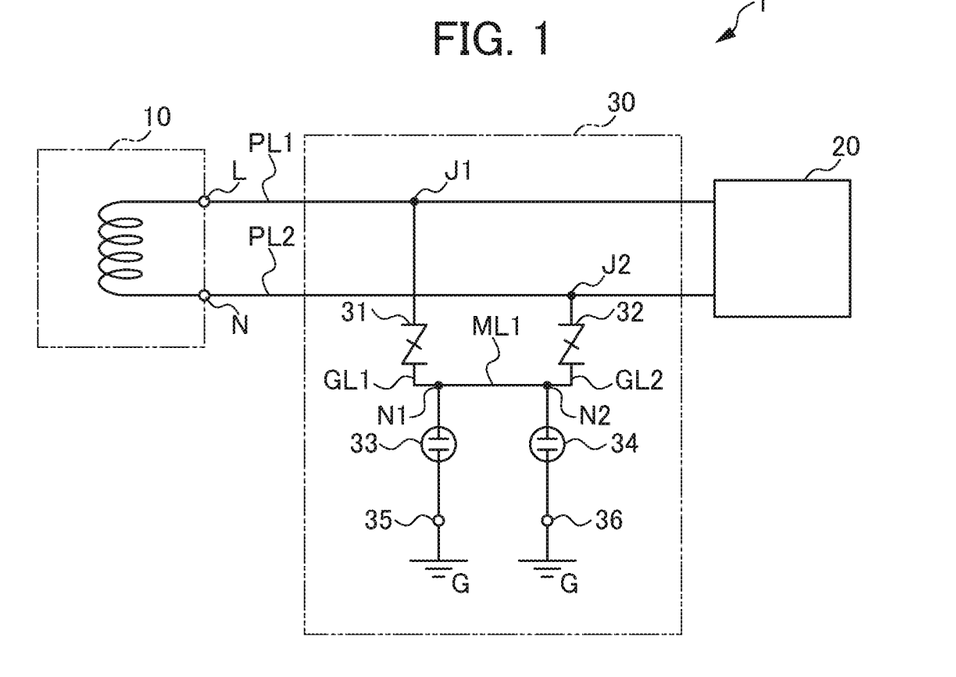
FIG. 1 is a circuit diagram illustrating a configuration of a power source system 1 including a surge protective circuit 30 according to a first embodiment.

FIG. 1 is a circuit diagram illustrating a configuration of a power source system 1 including a surge protective circuit 30 of the first embodiment. As illustrated in FIG. 1, the power source system 1 of the first embodiment includes a power source device 10, an electronic apparatus 20, and a surge protective circuit 30.

The power source device 10 is an AC power source that supplies single-phase AC power to the electronic apparatus 20. A first power line PL1 is connected to an L (non-ground-side) terminal of the power source device 10 and a second power line PL2 is connected to an N (ground-side) terminal.

The electronic apparatus 20 is an information terminal apparatus such as a personal computer (PC) used in an office or a computerized numerical controller used in a plant, for example. The electronic apparatus 20 may be a communication apparatus such as a router or a modem and an industrial apparatus such as a PLC or a robot controller, for example. AC power is supplied from the power source device 10 to the electronic apparatus 20 via the first power line PL1 and the second power line PL2.

The surge protective circuit 30 is a circuit that suppresses an overvoltage from being applied to the electronic apparatus 20 due to lightening surge entering the power source device 10. The surge protective circuit 30 may be configured as a part of the power source device 10 or the electronic apparatus 20, and as will be described later, the surge protective circuit 30 may be connected to the power line as a surge protective device. The surge protective circuit 30 includes a first varistor (a first constant-voltage device) 31, a second varistor (a second constant-voltage device) 32, a first gas arrestor (a first discharge device) 33, and a second gas arrestor (a second discharge device) 34. Moreover, the surge protective circuit 30 includes a first ground terminal 35 and a second ground terminal 36 connected to the ground G.

The first varistor 31 and the second varistor 32 are devices which are not conductive when a voltage lower than a rated voltage is applied thereto. However, when an overvoltage of the rated voltage or higher is applied due to lightening surge, the resistance decreases abruptly and the first and second varistors 31 and 32 enter into a conduction state. The first and second varistors 31 and 32 have a function of suppressing discharge of the first and second gas arrestors 33 and 34 to be described later by entering an insulation state when the voltage decreases to a predetermined range due to discharge of the first and second gas arrestors 33 and 34. In the following description, the first and second varistors 31 and 32 will be also referred to simply as a "varistor".

The first and second gas arrestors 33 and 34 are devices which enter a conduction state when an overvoltage of a discharge voltage or higher is applied due to lightening surge whereby discharge occurs. A surge current (an overcurrent) generated by an overvoltage due to lightening surge flows through one of the first and second varistors 31 and 32 and then flows through at least any one (or both) of the first and second gas arrestors 33 and 34 and is discharged from the first or second ground terminal 35 or 36 to the ground G. In the following description, the first and second gas arrestors 33 and 34 will be also referred to simply as a "gas arrestor".

As illustrated in FIG. 1, a first ground line GL1 is connected to the first power line PL1 at a junction J1 between the power source device 10 and the electronic apparatus 20. The first varistor 31 and the first gas arrestor 33 are connected in series to the first ground line GL1 in that order from the junction J1. That is, the first varistor 31 and the first gas arrestor 33 are connected in series between the first ground terminal 35 and the L-terminal of the power source device 10.

The second ground line GL2 is connected to the second power line PL2 at a junction J2 between the power source device 10 and the electronic apparatus 20. The second varistor 32 and the second gas arrester 34 are connected in series to the second ground line GL2 in that order from the junction J2. That is, the second varistor 32 and the second gas arrestor 34 are connected in series between the second ground terminal 36 and the N-terminal of the power source device 10.

In the surge protective circuit 30, a midpoint N1 between the first varistor 31 and the first gas arrestor 33 and a midpoint N2 between the second varistor 32 and the second gas arrestor 34 are connected by an intermediate line ML1. Due to this, a surge current flowing from the first varistor 31 flows into the first gas arrestor 33 through the midpoint N1 of the first ground line GL1 or flows from the midpoint N2 of the second ground line GL2 into the second gas arrestor 34 through the intermediate line ML1 from the midpoint N1 of the first ground line GL1. Moreover, a surge current flowing from the second varistor 32 flows into the second gas arrestor 34 through the midpoint N2 of the second ground line GL2 or flows from the midpoint N1 of the first ground line GL1 into the first gas arrestor 33 through the intermediate line ML1 from the midpoint N2 of the second ground line GL2.

In the power source system 1 of the first embodiment, when a failure does not occur in any one of the varistor and the gas arrestor connected to the surge protective circuit 30, and a surge current resulting from lightening surge is superimposed on the first power line PL1 or the second power line PL2, the surge current is discharged to the ground G via the varistor and the gas arrestor connected to the power line on which the surge current is superimposed.

Figure 2A:
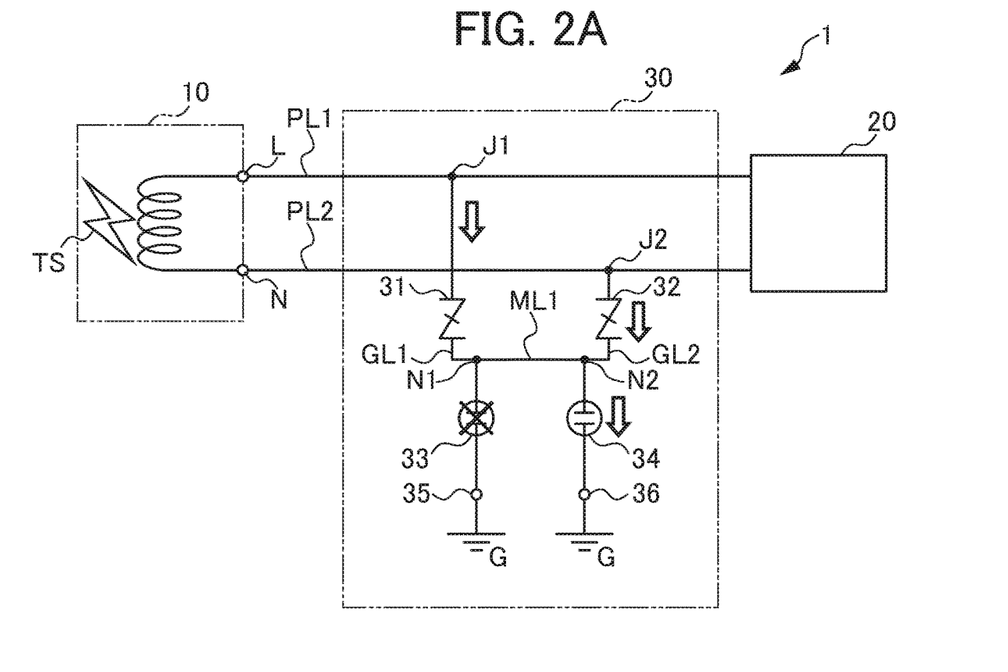
FIG. 2A is a circuit diagram illustrating an operation of the surge protective circuit 30 of the first embodiment when a failure occurs in a first gas arrestor 33.
Figure 2B:
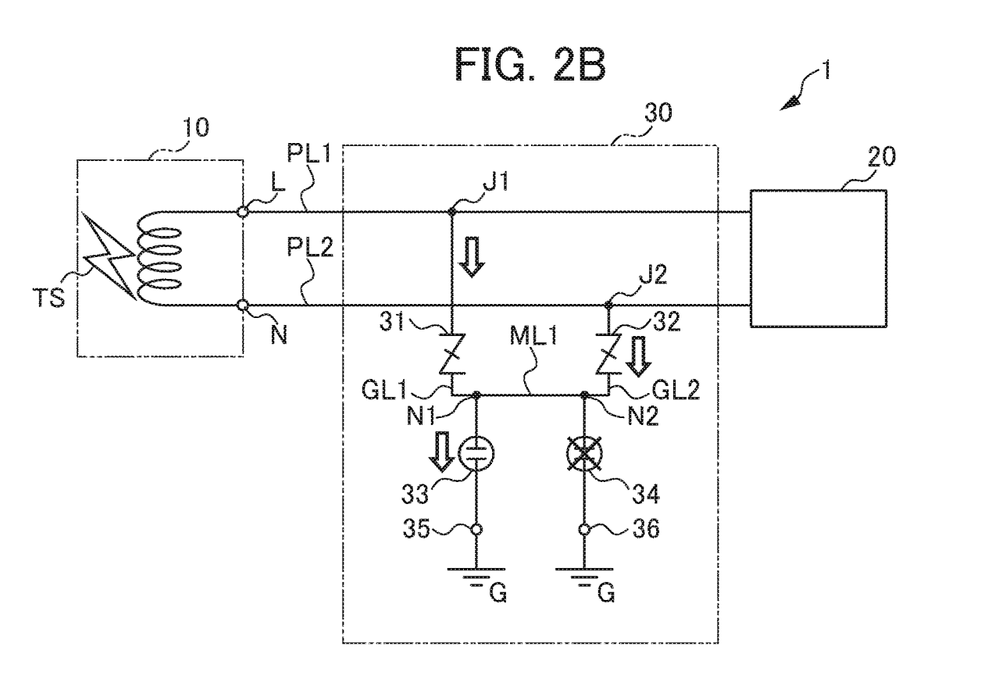
FIG. 2B is a circuit diagram illustrating an operation of the surge protective circuit 30 of the first embodiment when a failure occurs in a second gas arrestor 34.

Next, an operation of the surge protective circuit 30 when lightening surge occurs in the power source system 1 of the first embodiment will be described. FIGS. 2A and 2B are circuit diagrams illustrating an operation of the surge protective circuit 30 of the first embodiment when a failure occurs in one gas arrestor. In FIGS. 2A and 2B, a mark "x" is assigned to a gas arrestor in which a failure has occurred. An open-circuit failure is an example of a failure of the gas arrestor. An outlined arrow in the drawing indicates the flow of a surge current. In the drawing, an outlined lightening mark indicates a lightening surge TS occurring due to lightening.

As illustrated in FIG. 2A, when a failure occurs in the first gas arrestor 33, a surge current superimposed on the first power line PL1 due to occurrence of the lightening surge TS flows from the first varistor 31 into the normal second gas arrestor 34 through the intermediate line ML1 and is discharged to the ground G through the second ground terminal 36. Moreover, a surge current superimposed on the second power line PL2 flows from the second varistor 32 into the normal second gas arrestor 34 and is discharged to the ground G through the second ground terminal 36.

As illustrated in FIG. 2B, when a failure occurs in the second gas arrestor 34, the surge current superimposed on the first power line PL1 due to occurrence of the lightening surge TS flows from the first varistor 31 into the normal first gas arrestor 33 and is discharged to the ground C through the first ground terminal 35. Moreover, the surge current superimposed on the second power line PL2 flows from the second varistor 32 into the normal first gas arrestor 33 through the intermediate line ML1 and is discharged to the ground G through the first ground terminal 35. In this way, even when a failure occurs in either one of the two gas arrestors, the surge protective circuit 30 of the first embodiment can discharge the surge current to the ground G with the aid of the other normal gas arrestor.

Figure 3A:
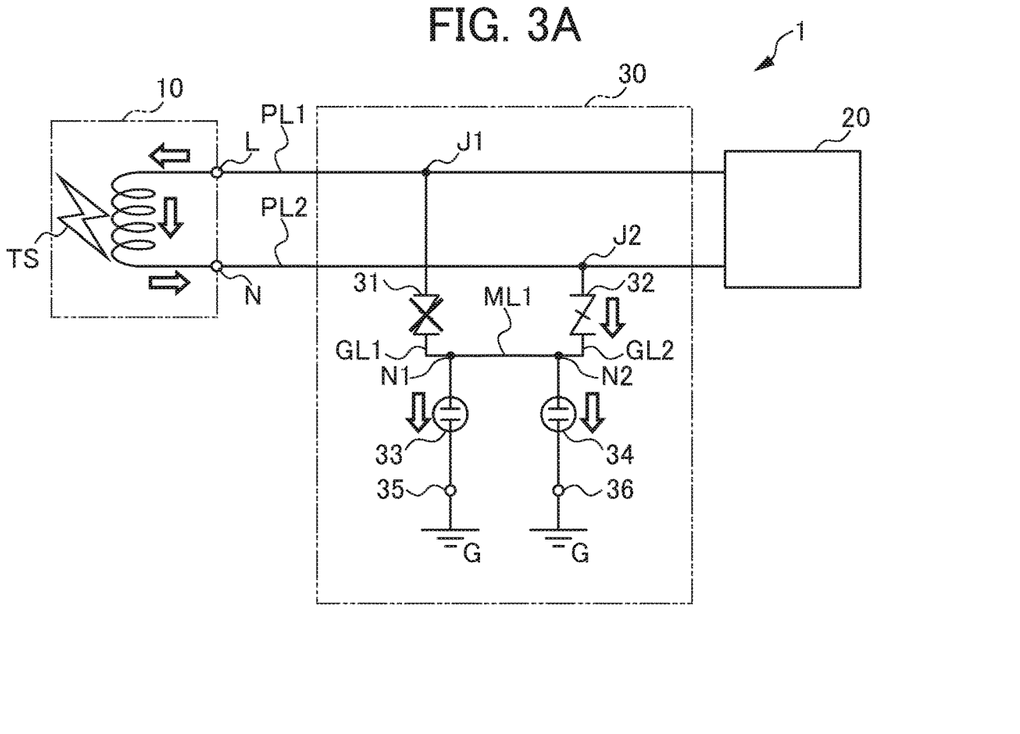
FIG. 3A is a circuit diagram illustrating an operation of the surge protective circuit 30 of the first embodiment when a failure occurs in a first varistor 31.
Figure 3B:
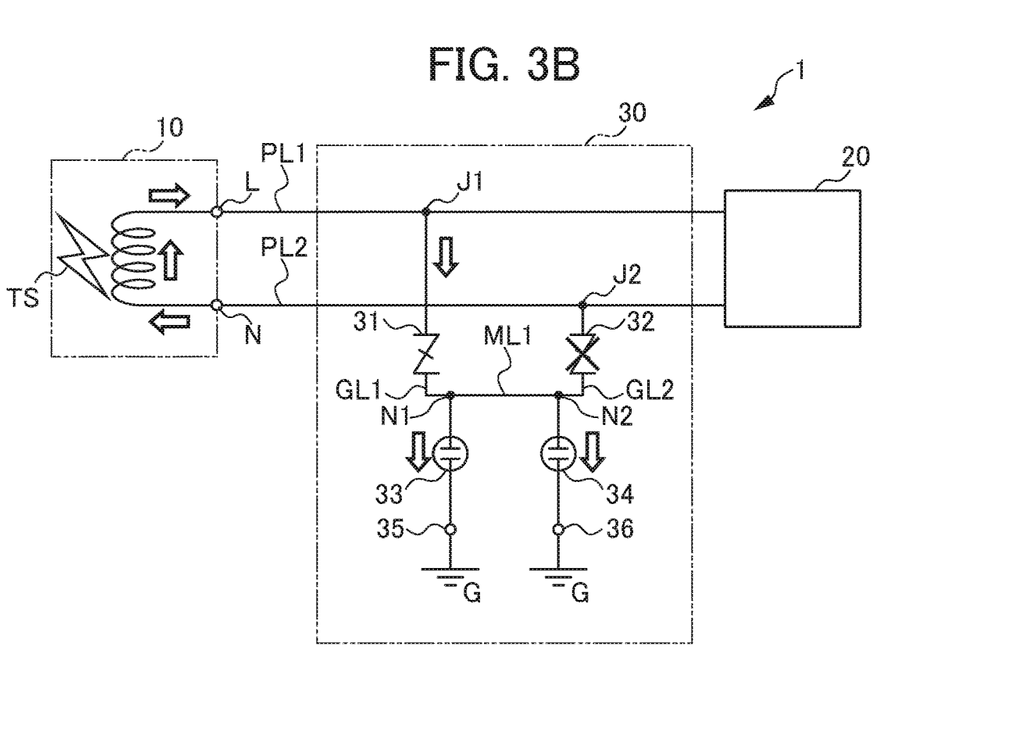
FIG. 3B is a circuit diagram illustrating an operation of the surge protective circuit 30 of the first embodiment when a failure occurs in a second varistor 32.

FIGS. 3A and 3B are circuit diagrams illustrating an operation of the surge protective circuit 30 of the first embodiment when a failure occurs in one varistor. In FIGS. 3A and 3B, a mark "x" is assigned to a varistor in which a failure has occurred. An open-circuit failure is an example of a failure of the varistor. An outlined arrow in the drawing indicates the flow of a surge current.

As illustrated in FIG. 3A, when a failure occurs in the first varistor 31, the surge current superimposed on the second power line PL2 due to occurrence of the lightening surge TS flows from the normal second varistor 32 into the first gas arrestor 33 or the second gas arrestor 34 (or both) and is discharged to the ground G through the first ground terminal 35 or the second ground terminal 36. Moreover, the surge current superimposed on the first power line PL1 due to occurrence of the lightening surge TS flows from the normal second varistor 32 to the first gas arrestor 33 or the second gas arrestor 34 (or both) via the power source device 10 or the electronic apparatus 20 and is discharged to the ground G through the first ground terminal 35 or the second ground terminal 36.

As illustrated in FIG. 3B, when a failure occurs in the second varistor 32, the surge current superimposed on the first power line PL1 due to occurrence of the lightening surge TS flows from the normal first varistor 31 into the first gas arrestor 33 or the second gas arrestor 34 (or both) and is discharged to the ground G through the first ground terminal 35 or the second ground terminal 36. Moreover, the surge current superimposed on the second power line PL2 due to occurrence of the lightening surge TS flows from the normal first varistor 31 into the first gas arrestor 33 or the second gas arrestor 34 (or both) via the power source device 10 or the electronic apparatus 20 and is discharged to the ground G through the first ground terminal 35 or the second ground terminal 36.

According to the surge protective circuit 30 of the first embodiment, as illustrated in FIGS. 2A and 2B, even when a failure occurs in either one of the first gas arrestor 33 or the second gas arrestor 34, the surge current can be discharged to the ground G via the other normal gas arrestor. Moreover, according to the surge protective circuit 30 of the first embodiment, as illustrated in FIGS. 3A and 3B, even when a failure occurs in either one of the first varistor 31 or the second varistor 32, the surge current can be discharged from the other normal varistor to the ground G via either one of the two gas arrestors.

In the surge protective circuit 30 of the first embodiment, the first and second varistors 31 and 32 are connected commonly to the first and second gas arrestors 33 and 34. Due to this, it is possible to reduce the number of varistors as compared to a configuration in which two sets of components each component being made up of one gas arrestor and two varistors are connected in parallel with respect to a power line as the above-described example of simple duplication. Therefore, according to the surge protective circuit 30 of the first embodiment, it is possible to reliably protect the electronic apparatus 20 from lightening surge while realizing reduction in the number of components.

Second Embodiment

Next, a second embodiment of the present invention will be described. In the following description and drawings, portions that perform functions similar to those of the first embodiment will be appropriately denoted by the same reference numerals or the reference numerals having the same ending characters (the last two digits), and the redundant description will be omitted appropriately.

Figure 4:
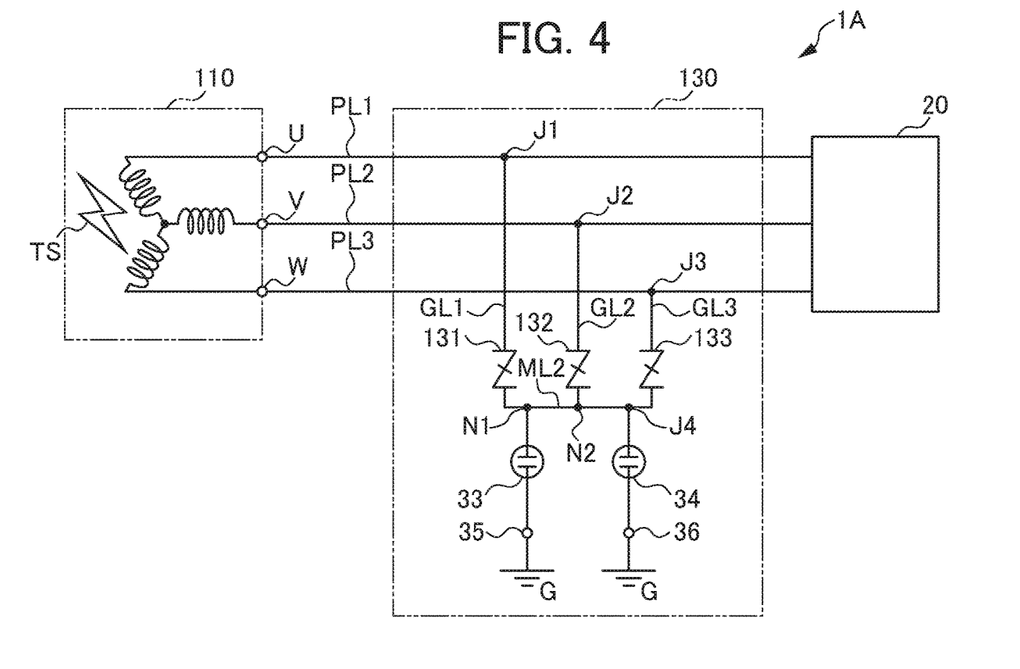
FIG. 4 is a circuit diagram illustrating a configuration of a power source system 1A including a surge protective circuit 130 according to a second embodiment.

FIG. 4 is a circuit diagram illustrating a configuration of a power source system 1A including a surge protective circuit 130 of the second embodiment. As illustrated in FIG. 4, the power source system 1A of the second embodiment includes a power source device 110, an electronic apparatus 20, and the surge protective circuit 130.

The power source device 110 is an AC power source that supplies three-phase AC power to the electronic apparatus 20. The first power line PL1 is connected to a U-terminal (a first phase terminal) on the output side of the power source device 110, a second power line PL2 is connected to a V-terminal (a second phase terminal), and a third power line PL3 is connected to a W-terminal (a third phase terminal).

The surge protective circuit 130 includes a first varistor (a first constant-voltage device) 131, a second varistor (a second constant-voltage device) 132, a third varistor (a third constant-voltage device) 133, a first gas arrestor (a first discharge device) 33, and a second gas arrestor (a second discharge device) 34. Moreover, the surge protective circuit 133 includes a first ground terminal 35 and a second ground terminal 36 connected to the ground G.

As illustrated in FIG. 4, a first ground line GL1 is connected to the first power line PL1 at a junction J1 between the power source device 110 and the electronic apparatus 20. The first varistor 131 and the first gas arrestor 33 are connected in series to the first ground line GL1 in that order from the junction J1. That is, the first varistor 131 and the first gas arrestor 33 are connected in series between the first ground terminal 35 and the U-terminal of the power source device 110.

A second ground line GL2 is connected to the second power line PL2 at a junction J2 between the power source device 110 and the electronic apparatus 20. The second varistor 132 and the second gas arrestor 34 are connected in series to the second ground line GL2 in that order from the junction J2. That is, the second varistor 132 and the second gas arrestor 34 are connected in series between the second ground terminal 36 and the V-terminal of the power source device 110.

A third ground line GL3 is connected to the third power line PL3 at a junction J3 between the power source device 110 and the electronic apparatus 20. The third varistor 133 is connected to the third ground line GL3. That is, one side of the third varistor 133 is connected to the W-terminal of the power source device 110.

Moreover, in the surge protective circuit 130, a midpoint N1 between the first varistor 131 and the first gas arrestor 33 and a midpoint N2 between the second varistor 132 and the second gas arrestor 34 are connected by an intermediate line ML2. The intermediate line ML2 extends up to a junction J4 ahead the midpoint N2, and a side opposite to the side of the third varistor 133 connected to the W-terminal of the power source device 110 is connected to the junction J4 of the intermediate line ML2. In this way, the downstream side of each of the first, second, and third varistors 131, 132, and 133 is connected to the first and second gas arrestors 33 and 34 via the intermediate line M12.

In the power source system 1A of the second embodiment, when a failure does not occur in any one of the varistors and the gas arrestors connected to the surge protective circuit 130, and a surge current resulting from the lightening surge TS is superimposed on any one of the first to third power lines PL1 to PL3, the surge current is discharged to the ground G via the varistor and the gas arrestor connected to the power line on which the surge current is superimposed.

Figure 5A:
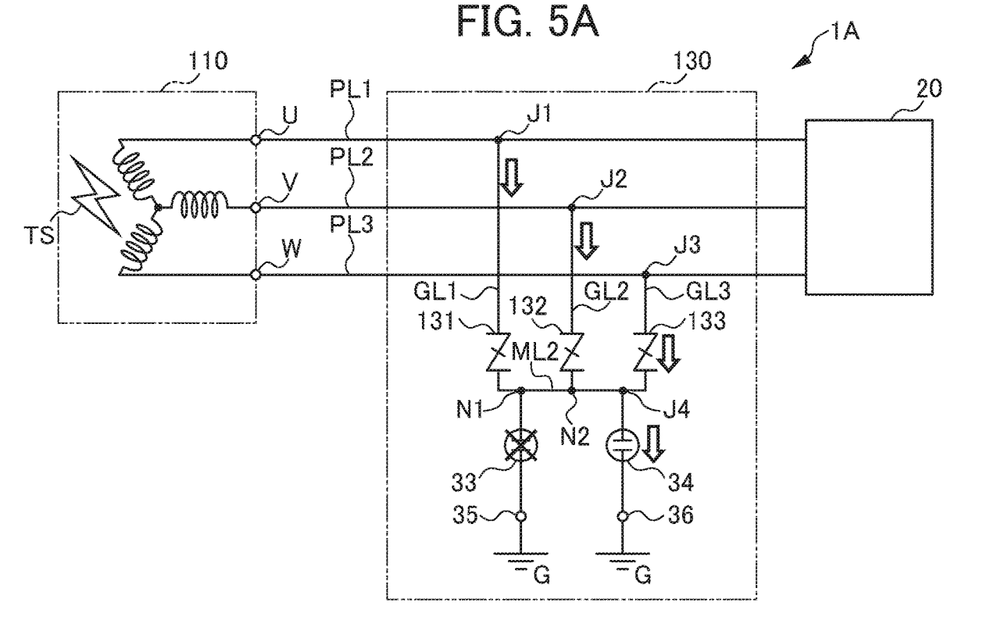
FIG. 5A is a circuit diagram illustrating an operation of the surge protective circuit 130 of the second embodiment when a failure occurs in the first gas arrestor 33.
Figure 5B:
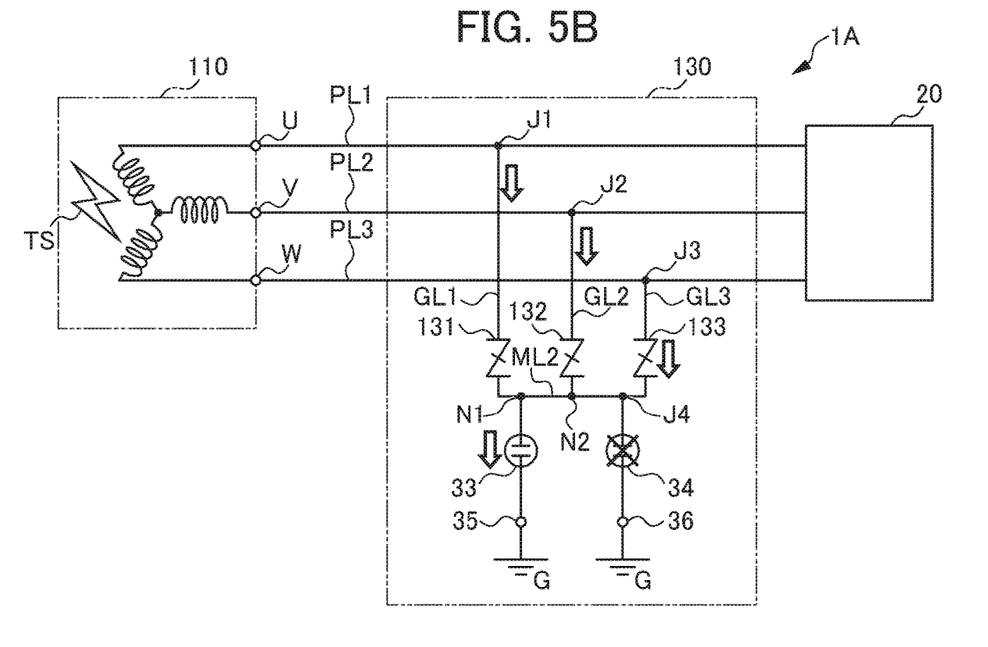
FIG. 5B is a circuit diagram illustrating an operation of the surge protective circuit 130 of the second embodiment when a failure occurs in the second gas arrestor 34.

Next, an operation of the surge protective circuit 130 when lightening surge occurs in the power source system 1A of the second embodiment will be described. FIGS. 5A and 5B are circuit diagrams illustrating an operation of the surge protective circuit 130 of the second embodiment when a failure occurs in one gas arrestor. In FIGS. 5A and 5B, a mark "x" is assigned to a gas arrestor in which a failure has occurred. An open-circuit failure is an example of a failure of the gas arrestor. An outlined arrow in the drawing indicates the flow of a surge current. In the drawing, an outlined lightening mark indicates a lightening surge TS occurring due to lightening.

As illustrated in FIG. 5A, when a failure occurs in the first gas arrestor 33, the surge current superimposed on any one of the first to third power lines PL1 to PL3 due to occurrence of the lightening surge TS flows from the varistor (131 to 133) connected to the power line on which the surge current is superimposed to the normal second gas arrestor 34 and is discharged to the ground G through the second ground terminal 36.

On the other hand, as illustrated in FIG. 5B, when a failure occurs in the second gas arrestor 34, the surge current superimposed on any one of the first to third power lines PL1 to PL3 due to occurrence of the lightening surge TS flows from the varistor (131 to 133) connected to the power line on which the surge current is superimposed to the normal first gas arrestor 33 and is discharged to the ground G through the first ground terminal 35. In this way, even when failure occurs in either one of the two gas arrestors, the surge protective circuit 130 of the second embodiment can discharge a surge current to the ground G with the aid of the other normal gas arrestor.

Figure 6A:
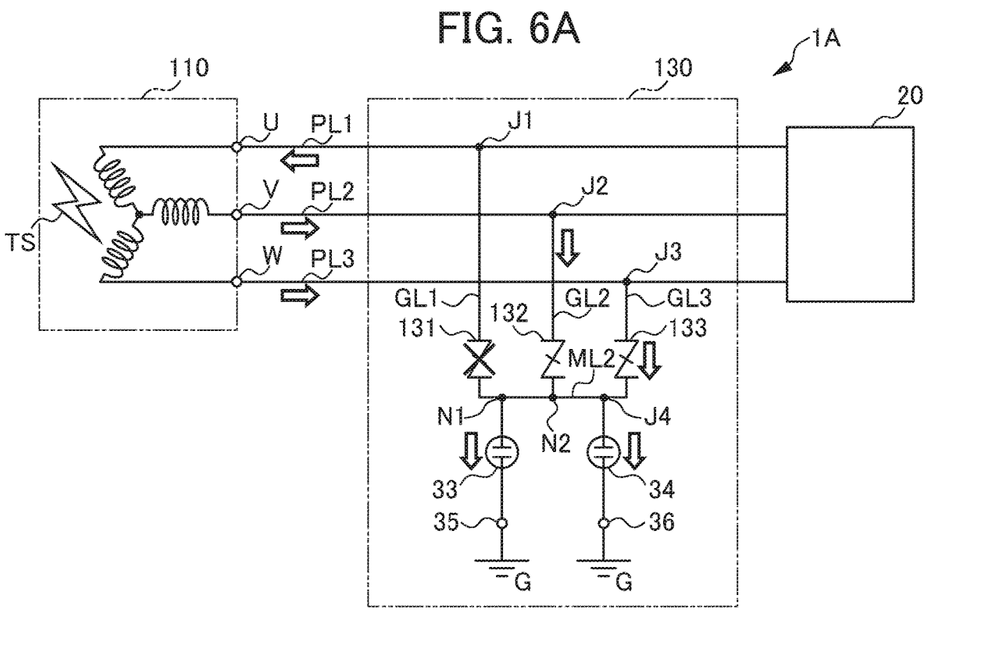
FIG. 6A is a circuit diagram illustrating an operation of the surge protective circuit 130 of the second embodiment when a failure occurs in a first varistor 131.
Figure 6B:
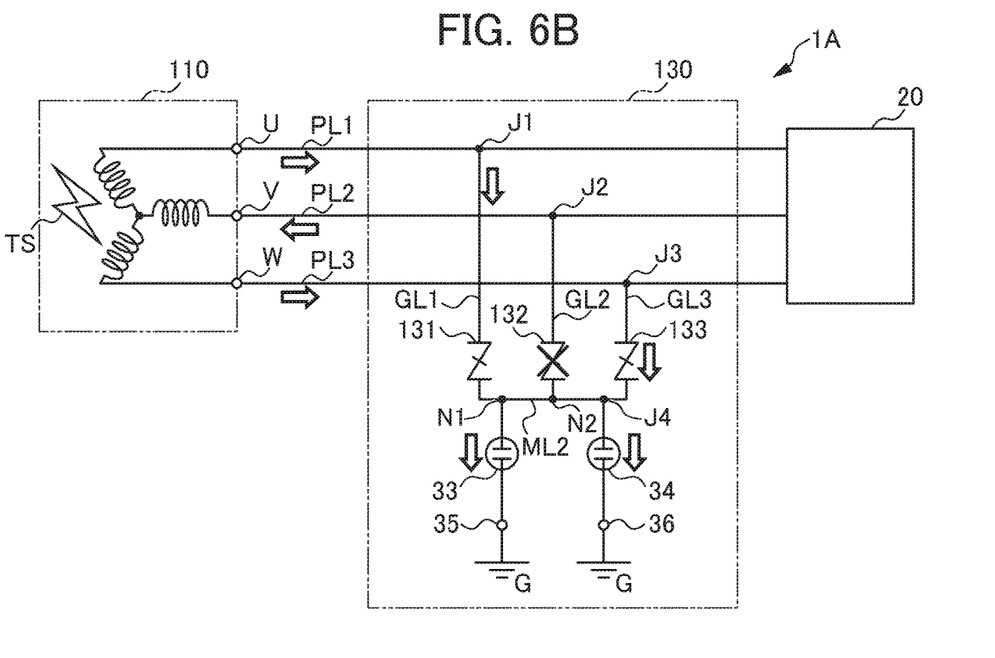
FIG. 6B is a circuit diagram illustrating an operation of the surge protective circuit 130 of the second embodiment when a failure occurs in a second varistor 132.
Figure 6C:
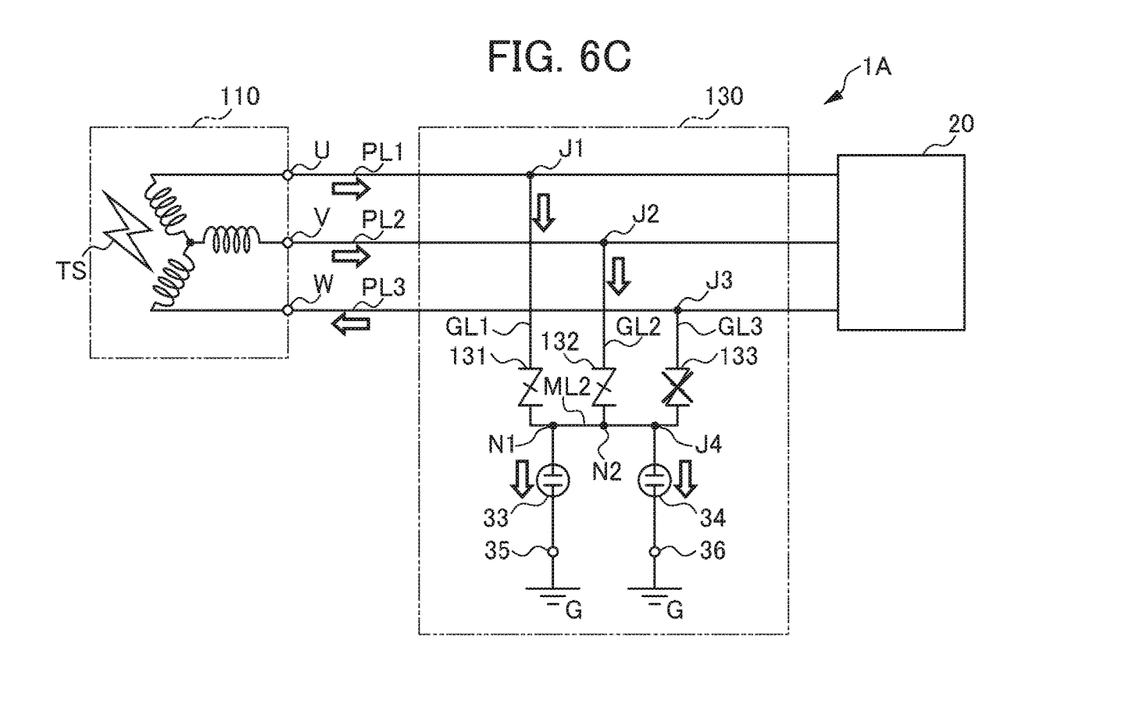
FIG. 6C is a circuit diagram illustrating an operation of the surge protective circuit 130 of the second embodiment when a failure occurs in a third varistor 133.

FIGS. 6A to 6C are circuit diagrams illustrating an operation of the surge protective circuit 130 of the second embodiment when a failure occurs in any one of varistors. In FIGS. 6A to 6C, a mark "x" is assigned to a varistor in which a failure has occurred. As illustrated in FIG. 6A, when a failure occurs in the first varistor 131, the surge current superimposed on the second power line PL2 or the third power line PL3 due to occurrence of the lightening surge TS flows from the normal second or third varistor 132 or 133 to the first or second gas arrestor 33 or 34 (or both) and is discharged to the ground G through the first or second ground terminal 35 or 36. Moreover, the surge current superimposed on the first power line PL1 due to occurrence of the lightening surge TS flows from the normal second or third varistor 132 or 133 to the first or second gas arrestor 33 or 34 (or both) via the power source device 110 or the electronic apparatus 20 and is discharged to the ground G through the first or second ground terminal 35 or 36.

As illustrated in FIG. 6B, when a failure occurs in the second varistor 132, the surge current superimposed on the first or third power line PL1 or PL3 due to occurrence of the lightening surge TS flows from the normal first or third varistor 131 or 133 to the first or second gas arrestor 33 or 34 (or both) and is discharged to the ground G through the first or second ground terminal 35 or 36. Moreover, the surge current superimposed on the second power line PL2 due to occurrence of the lightening surge TS flows from the normal first or third varistor 131 or 133 to the first or second gas arrestor 33 or 34 (or both) via the power source device 110 or the electronic apparatus 20 and is discharged to the ground G through the first or second ground terminal 35 or 36.

As illustrated in FIG. 6C, when a failure occurs in the third varistor 133, the surge current superimposed on the first or second power line PL1 or PL2 due to occurrence of the lightening surge TS flows from the normal first or second varistor 131 or 132 to the first or second gas arrestor 33 or 34 (or both) and is discharged to the ground G through the first or second ground terminal 35 or 36. Moreover, the surge current superimposed on the third power line PL3 due to occurrence of the lightening surge TS flows from the normal first or second varistor 131 or 132 to the first or second gas arrestor 33 or 34 (or both) via the power source device 110 or the electronic apparatus 20 and is discharged to the ground G through the first or second ground terminal 35 or 36.

According to the surge protective circuit 130 of the second embodiment, as illustrated in FIGS. 5A and 5B, even when a failure occurs in either one of the first or second gas arrestor 33 or 34, the surge current can be discharged to the ground G via the other normal gas arrestor. Moreover, according to the surge protective circuit 130 of the second embodiment, as illustrated in FIGS. 6A to 6C, even when a failure occurs in any one of the first to third varistors 131 to 133, the surge current can be discharged from the other normal two varistors to the ground G via the gas arrestor.

Moreover, in the surge protective circuit 130 of the second embodiment, the first to third varistors 131 to 133 are used in common to each of the first and second gas arrestors 33 and 34. Due to this, it is possible to reduce the number of varistors and gas arrestors as compared to a configuration in which two sets of components each component being made up of one gas arrestor and two varistors are connected in parallel with respect to a power line. Therefore, according to the surge protective circuit 130 of the second embodiment, it is possible to reliably protect the electronic apparatus 20 from lightening surge while realizing reduction in the number of components.

Third Embodiment

Figure 7:
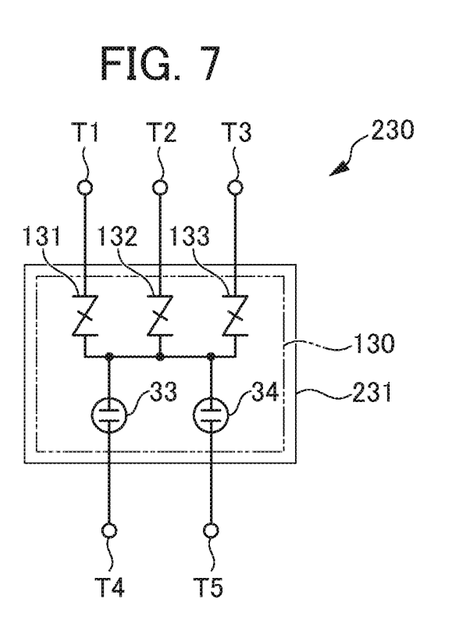
FIG. 7 is a conceptual diagram illustrating a configuration of a surge protective device according to a third embodiment.

Next, a third embodiment of the present invention will be described. FIG. 7 is a conceptual diagram illustrating a configuration of a surge protective device (SPD) according to a third embodiment. In the following description and drawings, portions that perform functions similar to those of the second embodiment will be appropriately denoted by the same reference numerals or the reference numerals having the same ending characters (the last two digits), and the redundant description will be omitted appropriately.

A surge protective device 230 of the third embodiment is a device in which the surge protective circuit 130 of the second embodiment is housed in an insulating case 231. As illustrated in FIG. 7, one set of terminals of the first, second and third varistors 131, 132 and 133 of the surge protective circuit 130 are connected to electrodes T1, T2, and T3, respectively. The electrodes T1 to T3 are electrodes of the power source system 1A illustrated in FIG. 4, connected to the first to third power lines PL1 to PL3, for example.

The other set of terminals of the first to third varistors 131 to 133 are connected to each of one set of terminals of the first and second gas arrestors 33 and 34. The other set of terminals of the first and second gas arrestors 33 and 34 are connected to electrodes T4 and T5, respectively. The electrodes T4 and T5 are electrodes of the power source system 1A illustrated in FIG. 4, connected to the ground G, for example.

In the surge protective device 230 of the present embodiment, since the respective components of the surge protective circuit 130 are housed in the insulating case 231, attachment and detachment of the surge protective device 230 to and from the power source system can be performed easily. In the third embodiment, the surge protective device 230 in which the surge protective circuit 130 of the second embodiment is housed in the insulating case 231 has been described. However, the present invention is not limited thereto, and the surge protective circuit 30 of the first embodiment may be housed in the insulating case 231.

While the embodiments of the present invention have been described, the present invention is not limited to the above-described embodiments, and various modifications and changes like a modified embodiment to be described later can be made and these modifications and changes also fall within the technical scope of the present invention. The effects described in the embodiments are only examples of most preferable effects produced by the present invention, and the effects of the present invention are not limited to those described in the embodiments. The above-described embodiments and the modified embodiment to be described later can be appropriately used in combination, and the detailed description thereof will be omitted.

Modified Embodiment

In the embodiments, an example in which two gas arrestors are provided in a surge protective circuit has been described. However, the present invention is not limited thereto. In the surge protective circuit, three or more gas arrestors may be provided. In the surge protective circuit of the embodiment, an alarm contact for informing of activation of a varistor and a gas arrestor in response to a lightening surge may be provided. In the surge protective circuit of the embodiment, a function of displaying deterioration of a varistor may be provided. For example, a fuse may be provided between a power line and a varistor, and an alarm lamp connected to the fuse may be turned off when the fuse melts down due to a temperature rise resulting from deterioration of the varistor. In this way, it is possible to notify of deterioration of the varistor visually.

EXPLANATION OF REFERENCE NUMERALS

1, 1A: Power source system
10, 110: Power source device
20: Electronic apparatus
30, 130: Surge protective circuit
31, 131: First varistor
32, 132: Second varistor
33: First gas arrestor
34: Second gas arrestor
35: First ground terminal
36: Second ground terminal
133: Third varistor
230: Surge protective device
N1, N2: Midpoint

What is claimed is:

1. A surge protective circuit connected between a single-phase AC power source and an apparatus that operates with electric power supplied from the AC power source to suppress an overvoltage applied from the AC power source to the apparatus, the surge protective circuit comprising:
   a first constant-voltage device and a first discharge device connected with one another between a first ground terminal and a non-ground-side terminal of the AC power source;
   and a second constant-voltage device and a second discharge device connected with one another between a second ground terminal and a ground-side terminal of the AC power source, wherein
   a midpoint between the first constant-voltage device and the first discharge device and a midpoint between the second constant-voltage device and the second discharge device are connected,
   the first and second constant-voltage devices do not conduct at a voltage lower than a rated voltage, but when an overvoltage of the rated voltage or more is applied due to a surge, the resistance decreases abruptly and the first and second constant-voltage devices becomes a conductive state,
   the first and second discharge devices are brought into a conductive state by being discharged by applying an overvoltage equal to or higher than the discharge voltage due to a surge,
   the first and second constant-voltage devices have a function of suppressing discharge of the first and second discharge devices by becoming an insulating state when the voltage drops to a predetermined range due to discharge of the first and second discharge devices,
   the midpoint between the first constant-voltage device and the first discharge device and the midpoint between the second constant-voltage device and the second discharge device are connected by an intermediate line,
   in an absence of a failure of the first constant-voltage device, the first discharge device, the second constant-voltage device, and the second discharge device,
   a surge current on a first power line connecting the AC power source to the first constant-voltage device is discharged through the first constant-voltage device and the first discharge device, or discharged through the first constant-voltage device, the intermediate line and the second discharge device, and a surge current on a second power line connecting the AC power source to the second constant-voltage device is discharged through the second constant-voltage device and the second discharge device, or discharged through the second constant-voltage device, the intermediate line and the first discharge device, if a failure occurs in one of the first and second discharge devices, a surge current is discharged by the other discharge device, and if a failure occurs in one of the first and second constant-voltage devices, surge current is discharged through at least one of the first and second discharge devices from the other constant-voltage device.

2. A surge protective device comprising the surge protective circuit according to claim 1.

3. The surge protective circuit of claim 1, wherein,
a terminal of the first constant-voltage device is directly connected only to the non-ground-side terminal of the AC power source and a first terminal of the apparatus, and a terminal of the second constant-voltage device is directly connected only to the ground-side terminal of the AC power source and a second terminal of the apparatus.

4. A surge protective circuit connected between a three-phase AC power source and an apparatus that operates with electric power supplied from the AC power source to suppress an overvoltage applied from the AC power source to the apparatus, the surge protective circuit comprising:

a first constant-voltage device and a first discharge device connected with one another between a first ground terminal and a first phase terminal of the AC power source; a second constant-voltage device and a second discharge device connected with one another between a second ground terminal and a second phase terminal of the AC power source; and a third constant-voltage device connected to a third phase terminal of the AC power source, wherein a midpoint between the first constant-voltage device and the first discharge device, a midpoint between the second constant-voltage device and the second discharge device, and a side of the third constant-voltage device opposite to a side connected to the third phase terminal are connected, the first, second and third constant-voltage devices do not conduct at a voltage lower than a rated voltage, but when an overvoltage of the rated voltage or more is applied due to a surge, the resistance decreases abruptly and the first, second and third constant-voltage devices becomes a conductive state, the first and second discharge devices are brought into a conductive state by being discharged by applying an overvoltage equal to or higher than the discharge voltage due to a surge, the first, second and third constant-voltage devices have a function of suppressing discharge of the first and second discharge devices by becoming an insulating state when the voltage drops to a predetermined range due to discharge of the first, second and third discharge devices, the midpoint between the first constant-voltage device and the first discharge device, the midpoint between the second constant-voltage device and the second discharge device, and the side of the third constant-voltage device opposite to the side connected to the third phase terminal are connected by an intermediate line, in an absence of a failure of the first constant-voltage device, the first discharge device, the second constant-voltage device, the second discharge device and the third constant-voltage device, a surge current on a first power line connecting the AC power source to the first constant-voltage device is discharged through the first constant-voltage device, the intermediate line, and at least one of the first and second discharge devices, a surge current on a second power line connecting the AC power source to the second constant-voltage device is discharged through the second constant-voltage device, the intermediate line, and at least one of the first and second discharge devices, and a surge current on a third power line connecting the AC power source to the third constant-voltage device is discharged through the third constant-voltage device, the intermediate line, and at least one of the first and second discharge devices, if a failure occurs in one of the first and second discharge devices, surge current is discharged by the other discharge device, and if a failure occurs in one of the first, second and third constant-voltage devices, surge current is discharged through at least one of the first and second discharge devices from at least one of the other constant-voltage devices.

5. A surge protective device comprising the surge protective circuit according to claim 4.

6. The surge protective circuit of claim 4, wherein,
the first discharge device is a first gas arrestor, and
the second discharge device is a second gas arrestor.

7. The surge protective circuit of claim 4, wherein,
a terminal of the first constant-voltage device is directly connected to the first phase terminal of the AC power source, a terminal of the second constant-voltage device is directly connected to the second phase terminal of the AC power source, and a terminal of the third constant-voltage device is directly connected to the third phase terminal of the AC power source.

* * * * *